Figure 1:
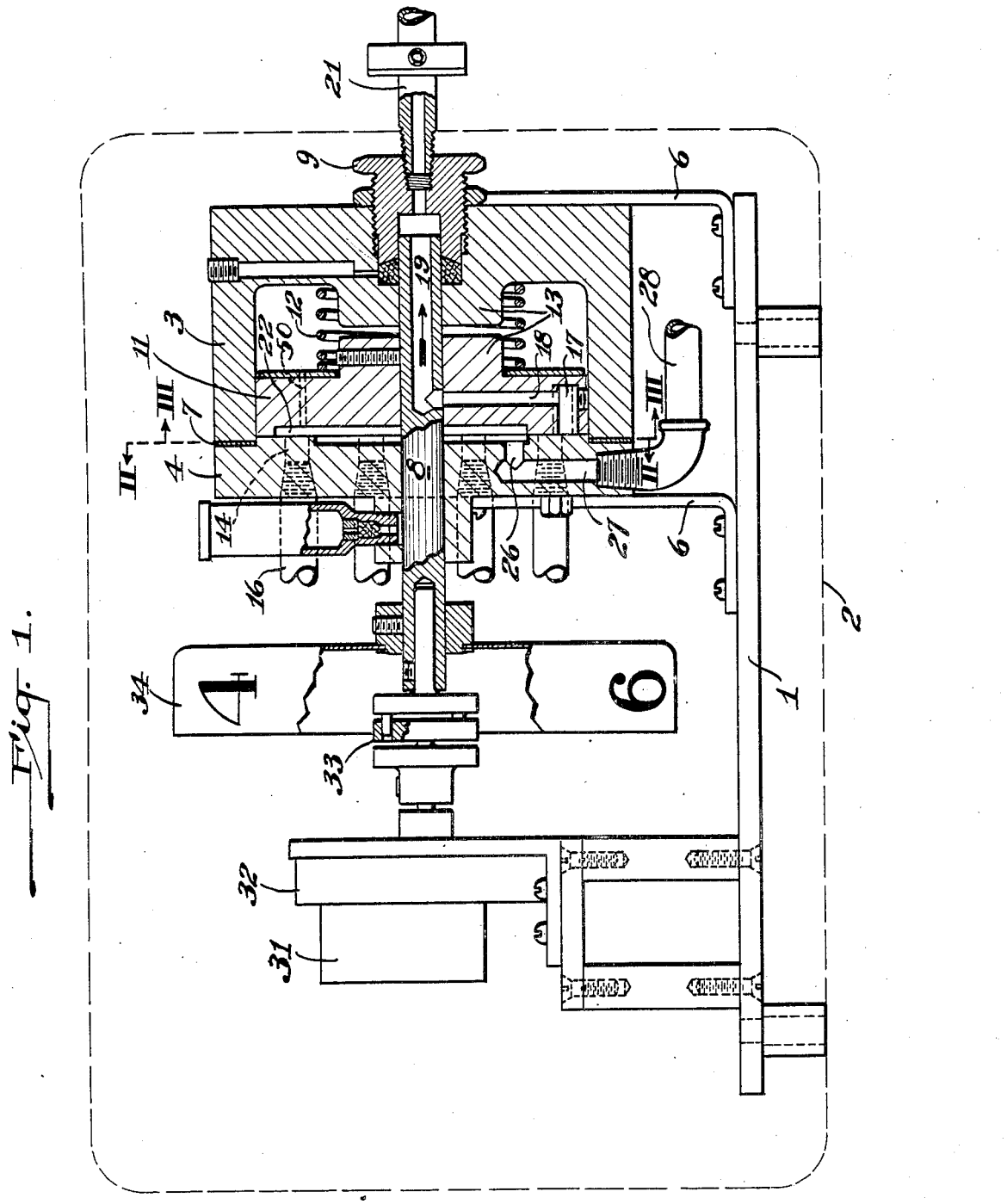

Nov. 9, 1943.　　　M. G. JACOBSON　　　2,333,934
MULTIPLE SAMPLING VALVE AND METHOD OF GAS SAMPLING
Filed July 14, 1939　　2 Sheets-Sheet 1

INVENTOR.
Moses G. Jacobson
BY Brown, Critchlow & Flick
his ATTORNEYS.

Patented Nov. 9, 1943

2,333,934

UNITED STATES PATENT OFFICE 2,333,934

MULTIPLE SAMPLING VALVE AND METHOD OF GAS SAMPLING

Moses G. Jacobson, Penn Township, Allegheny County, Pa., assignor to Mine Safety Appliances Company, Pittsburgh, Pa., a corporation of Pennsylvania Application July 14, 1939, Serial No. 284,500

5 Claims. (Cl. 23—232)

This invention relates to valves, and more particularly to multiple sampling valves used in connection with apparatus for analyzing samples of gases (including air) taken successively from several different locations, such as from several furnaces, mine passages, floors of buildings or the like.

It is the customary practice to connect sampling lines or conduits leading from the atmospheres in such locations to the analyzing apparatus through a valve which is actuated to successively connect each separate conduit with the analyzing apparatus. The valves used for this purpose heretofore, however, have been expensive to make because of the various joints that have to be formed so accurately and sealed to prevent leakage. In spite of this, unless the gas being analyzed is first thoroughly filtered, foreign solid particles in the gas will lodge on the valve seat and permit it to leak. A major disadvantage is especially noticeable when the valve is connected to relatively long sampling lines. After the sample from one line has been taken and the valve is turned to the next line it requires quite some time for the gas at that moment in the location from which a sample is to be taken to be drawn through the conduit and valve to the analyzing apparatus. With sampling lines 50 feet long and ¾ inch internal diameter, for example, it requires with a gas flow of two liters per minute about two minutes to take each sample, and with short sampling lines less than 10 feet long it requires about twenty-five seconds per sample. When several lines are being sampled in this way it means that several minutes elapse between successive sampling of the same line.

It is among the objects of this invention to provide a multiple sampling valve which permits analysis of samples of gas from a plurality of locations in rapid succession, which is simple in construction, which is substantially leak-proof, which indicates the line from which a gas sample is being analyzed, and which automatically ceases its continuous movement when a sample being analyzed has dangerous characteristics.

In accordance with this invention a plurality of sampling lines are connected to a stationary member, and a rotary member associated with the stationary member is provided with a passage for connecting each of said lines in succession with gas analyzing apparatus. Preferably, this passage opens into an axial passage in the shaft that carries the rotary member, and the outer end of the shaft passage is adapted to be connected to the analyzing apparatus. During analysis of a sample from any of the sampling lines, the remaining lines open into a recess between the stationary and rotary members. This recess is connected by a passage through the stationary member with a suitable source of suction so that gas is drawn from all of the lines simultaneously and consequently, when a sampling line is connected to the analyzing apparatus a fresh sample of gas is already at the valve ready to flow to the analyzer. This valve is preferably provided with means rotating with its rotary member and bearing numerals corresponding to the numbers of the sampling lines for indicating the line from which a sample is being analyzed at any given time. Means actuated by the analyzing apparatus stops the motor that turns the rotary valve member whenever a gas sample being analyzed exhibits dangerous characteristics.

Figure 2:
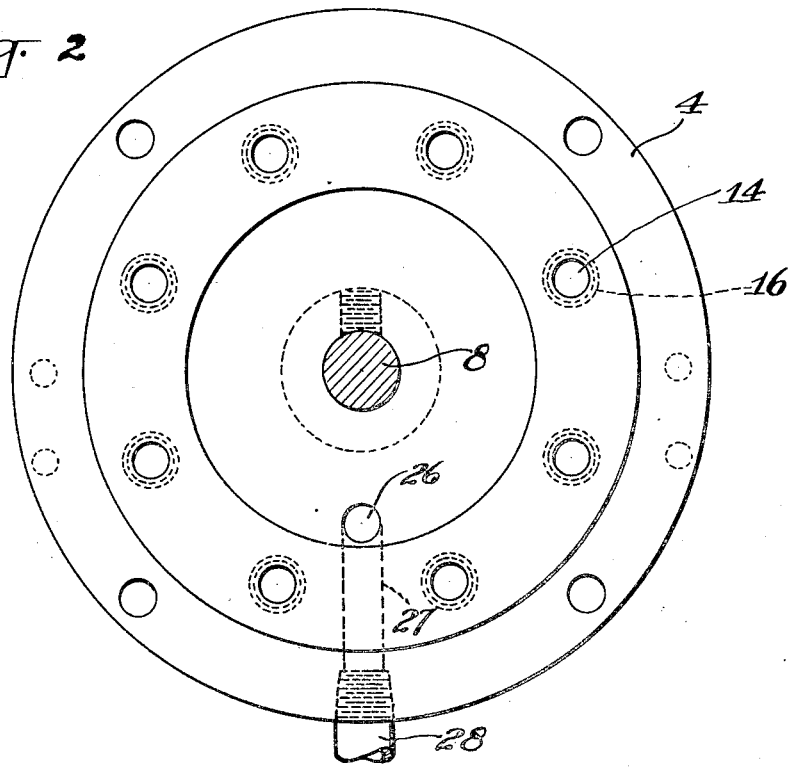
Figure 3:
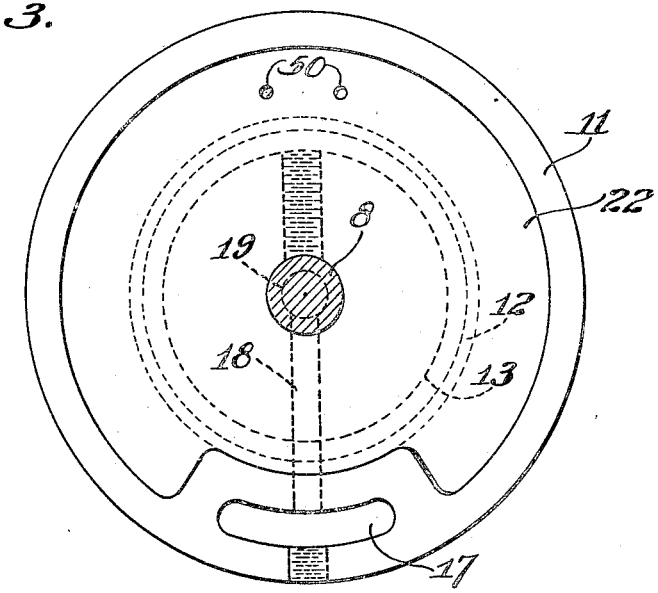

The preferred embodiment of the invention is illustrated in the accompanying drawings in which Fig. 1 is a side view of my valve mostly in vertical section and showing the rotor passage at a point where it is passing from one opening in the stationary member to the next adjacent one; and Figs. 2 and 3 are enlarged face views of the stationary and rotary members, taken on the lines II—II and III—III, respectively, of Fig. 1.

Referring to Fig. 1 of the drawings, the multiple sampling valve is shown mounted on a support I in a portable carrying case the inner outline of which is indicated by a broken line 2. The valve casing is a hollow cylindrical member 3 closed at one end by an integral wall and at the opposite end by a disc-like head or stator 4. These two members are rigidly mounted on support I by brackets 6 with a gasket 7 disposed between the head and casing for sealing purposes. Rotatably and slidably mounted in the head is a horizontal shaft 8 the inner end of which is similarly mounted in the integral end wall of the casing where it projects into a tubular packing gland nut 9 screwed into an enlarged opening in that wall. Rigidly mounted on this shaft within the valve casing is a rotatable valve member or rotor 11 that seats flat against the inner surface of head 4 against which it is pressed by a coil spring 12 encircling bosses 13 formed on the adjacent faces of the rotor and casing end wall around shaft 8. One of the two contacting surfaces, preferably that of the rotor, is made of low friction or selflubricating material, such, for example, as graphitized bronze.

The valve head is provided with a plurality of horizontal or transverse openings 14 therethrough arranged in a circle coaxial with the shaft (Fig. 2) with their outer ends adapted to be connected to conduits or lines 16 communicating with the various areas from which samples of gas are to be taken for analysis. To permit a gas sample to be taken from each individual line in succession, the rotor is provided with a horizontal port 17 extending inwardly from its sealing surface. The outer end of this port is adapted to register with any one of the sampling line openings 14 in the head, and its inner end is connected by a radial passage 18 through the rotor and part of the shaft with an axial passage 19 in the shaft that opens into nut 9. The outer end of the gland nut is adapted to threadedly receive a conduit 21 leading to suitable gas analyzing apparatus of which many types are well known. As shown in Fig. 3, port 17 in the rotor is an arcuate slot which is long enough to register momentarily with portions of two adjacent openings 14 at the same time, whereby the gas that is admitted to the analyzing apparatus is gradually changed from one line to another as shaft 8 rotates, instead of being completely shut off for a moment and then admitted which would cause undesirable surging in the analyzer.

It is a feature of this invention that during the sampling from any one line gas continues to flow through the other lines, so that when any one of them is connected by the rotor to the analyzing apparatus the gas received almost from the start represents the condition existing substantially at that time at its place of origin. Accordingly, the inner surface of the rotor is provided with a recess 22 into which open the inner ends of all the head openings 14, except the one from which a gas sample is being taken at any given time. This recess is circular for the major portion of its periphery, but at one point the portion of the rotor that contains port 17 projects into its side, as shown in Fig. 3. To constantly draw gases through this recess from the sampling lines, the valve head is provided with a short horizontal port 26 opening into recess 22 and the inner end of a radial passage 27. The outer end of this passage is connected by a conduit 28 to a source of suction, preferably the same pump that draws gas through the rotor passage and the analyzing apparatus. Thus, the lines that are not being sampled at any given time are by-passed around the analyzing apparatus.

The rotor shaft is constantly rotated by means of a motor 31 mounted on the support 1 and connected through a speed reduction unit 32 to a coupling 33 that permits the rotor shaft to move axially as its surface is worn down by engagement with the valve head while being held tight against it by the spring 12. The shaft is turned at a predetermined rate that will cause the rotor port to register with any given opening 14 just long enough for adequate sampling. Recess 22 is connected with the chamber where spring 12 is located by one or more horizontal holes 50 drilled through the body of the rotor. This avoids any difference in pressure between the two chambers, and the rotor is pressed against the valve head only by the compression of spring 12 which is only strong enough to assure a good seal without excessive wear of the contacting surfaces.

In order to acquaint the observer with the line that is being sampled at any time, an indicator wheel 34 is mounted on the rotor shaft outside of the valve casing. Inscribed on this wheel are numerals corresponding to the numbers of the sampling lines, and each of these numerals can be observed, while gas from its corresponding line is being sampled, through an opening in the side wall of the carrying case.

The analyzing apparatus is provided with any suitable means for closing a limit switch or other device connected to the driving motor whenever the gas being sampled from any given line reaches a predetermined dangerous point. When the motor is thus shut off the observer can tell from the numbers on wheel 34 which line furnished the dangerous sample.

It will be observed that in a valve constructed in accordance with this invention the only moving points that have to be sealed are the engaging faces of the head and of the portion of the rotor surrounding its slot 17, and the packing gland around the inner end of shaft 8. Any opening between shaft 8 and its bearing and at the joint 7 between parts 3 and 4 of the housing will only add air to the mixed samples from all non-engaged lines in recess 22, and since this is not conveyed to the analyzing apparatus but is by-passed around it and the suction prevents any of this air to leak back from the recess 22 to any of the individual sampling lines, or to the outside, it is not necessary to make the bearing of shaft 8 and joint 7 gastight. The coil spring holds the rotor tightly against the valve head at all times, the slidable mounting of the shaft in the valve permitting wear of the valve seat to be taken up. With this valve the time elapsing between successive sampling from the same line, even when six or eight lines are connected to the valve, is very short compared with previous sampling practice.

According to the provisions of the patent statutes, I have explained the principle and mode of operation of my invention, and have illustrated and described what I now consider to represent its best embodiment. However, I desire to have it understood that, within the scope of the appended claims, the invention may be practiced otherwise than as specifically illustrated and described.

1. A multiple sampling valve, comprising a stationary member containing a plurality of independent passageways connectable at one end to independent sampling lines and opening therethrough at the other end in a regularly arranged series of openings, said member having an outlet passageway therethrough independent of said series, and a rotatable member adjoining said stationary member and containing a recess of such extent and so arranged as at all times during rotation to furnish communication between said outlet passageway and a plurality of the openings of said series, said rotatable member having a passage therethrough opening into a second recess therein, and said second recess being of such extent and so arranged that during rotation each opening of said series is successively connected to said passage of the rotatable member and cut off therefrom and portions of two adjacent openings of said series are simultaneously connected to that passage so that one adjacent opening remains connected until the connection through the other is established.

2. A muliple sampling valve comprising a stationary member provided with a plurality of openings adapted to be connected to a plurality of sampling lines, a rotatable member associated with said stationary member and provided with a passage adapted upon rotation of the rotatable member to register successively with each of said openings, means for driving said rotatable member continuously, said passage being of sufficient size to simultaneously connect with portions of two adjacent openings to provide an uninterrupted flow of gas through the passage, one of said members being provided with a recess communicating simultaneously with the openings that are out of communication with said passage, and said stationary member having an outlet passage communicating with said recess.

3. A multiple sampling valve comprising a disc-like stationary member provided with a plurality of openings therethrough disposed in a circle and adapted to be connected on one side to a plurality of sampling lines, a disc-like rotary member disposed flat against the face of said stationary member opposite to said lines and provided with a passage adapted upon rotation of the rotary member to register successively with each of said openings, said passage being of sufficient size to simultaneously connect with portions of two adjacent openings to provide an uninterrupted flow of gas through the passage, the inner face of one of said members being provided with a recess communicating simultaneously with the openings that are not communicating with said passage, and said stationary member having an outlet passage communicating with said recess.

4. The method of sampling gas from a plurality of sampling lines, comprising maintaining a continuous flow through said plurality of sampling lines, diverting in continuous succession the flow from each sampling line through a gas analyzing apparatus, and shutting off the flow from each line through the gas analyzing apparatus subsequent to the diversion of flow from the succeeding sampling line.

5. A multiple sampling valve comprising a stationary member provided with a plurality of openings therethrough disposed in a circle and adapted to be connected on one side to a plurality of sampling lines, cup-like means having its edge disposed in sealing engagement with the marginal portion of the face of said stationary member opposite to said lines, a rotary member disposed in said cup-like means flat against said face of the stationary member and provided with a passage adapted upon rotation of the rotary member to register successively with each of said openings, resilient means in said cup-like means for pressing the rotary member against the stationary member, the inner surface of one of said members being provided with a recess communicating simultaneously with the openings that are not in communication with said passage, said sationary member having an outlet passage communicating with said recess, and said rotary member being provided with a passage connecting said recess with the inside of the cup-like means to equalize the pressures on the opposite sides of the rotary member.

MOSES G. JACOBSON.